June 26, 1923.
K. R. HAMMOND
COMPUTING MACHINE
Filed Dec. 31, 1919
1,459,886
2 Sheets-Sheet 1
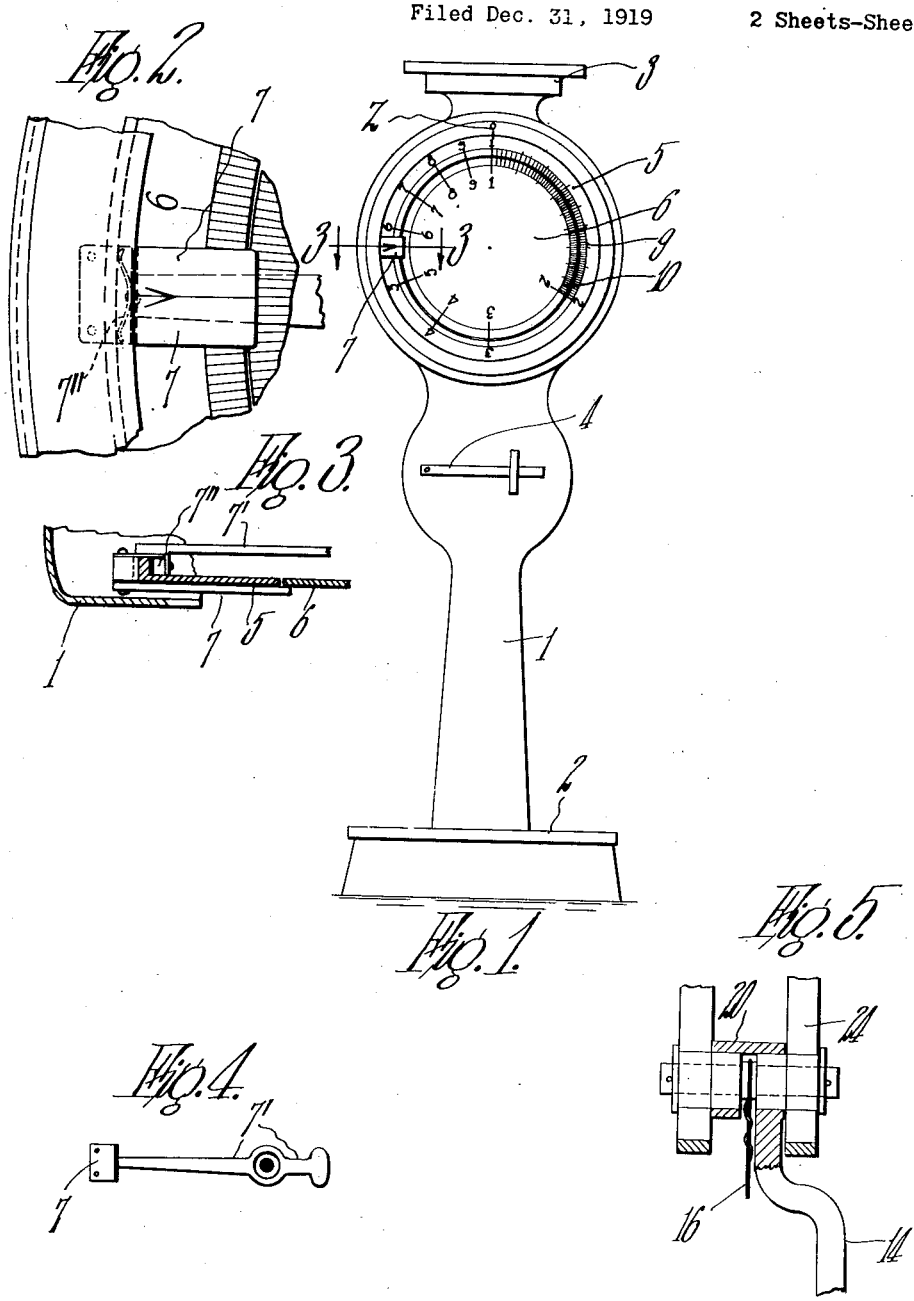

June 26, 1923.

K. R. HAMMOND

COMPUTING MACHINE

Filed Dec. 31, 1919

INVENTOR
Karl R. Hammond.
BY
Chapin + Neal
ATTORNEYS.

Patented June 26, 1923.

1,459,886

UNITED STATES PATENT OFFICE.

KARL R. HAMMOND, OF SPRINGFIELD, MASSACHUSETTS.

COMPUTING MACHINE.

Application filed December 31, 1919. Serial No. 348,655.

*To all whom it may concern:*

Be it known that I, KARL R. HAMMOND, a citizen of the United States of America, residing at Springfield, in the county of Hampden and State of Massachusetts, have invented certain new and useful Improvements in Computing Machines, of which the following is a specification.

This invention relates to a ratio computing machine and in its broad aspect has for its object the provision of automatically operating means for determining the ratio between two measured quantities. In its more particular application the invention is useful for counting units by determining the ratio of weight between a known number of units and an unknown number of units which it is desired to count.

Weighing machines are now well known for the counting of units on the principle of weighing a small known number of said units in comparison with a larger unknown number but such machines, so far as I am aware are operated on a scale beam or balance principle in which the weight of the known number is used as an adjustable counterpoise to directly balance the unknown number. Such machines are suitable for a rough calculation and for the counting of articles having an appreciable weight such as hardware pieces and the like. However, for the more precise counting of lighter articles, sheets of paper for instance, such machines have not been found to be practical for the reason that the errors or variations in count obtained by different persons using the same machine or by the same person using the machine at different times due to the human element incident to the adjustment of the counterpoise renders such machines impracticable for the purposes herein sought.

The principle upon which the operation of the present improvement is based is that of obtaining by comparative weights a ratio of quantities upon adjacently positioned logarithmic scales analogous to a manual manipulation of the well known "slide rule" whereby the numerical count or any multiplication, division, or other computation thereof may be read off directly from the scale. In this manner an accurate count may be obtained without the intervention of the human element in determining the answer other than a correct reading of the scale.

As a typical embodiment of the invention I disclose herein an apparatus for counting the number of paper sheets which may be contained in a large roll of paper, but obviously the apparatus may be used for the counting of other articles as well. The present apparatus provides a weighing platform for the roll, a weighing scale pan for a few sheets of paper, say 20 or 30 of the size which are to be cut from the roll and an arrangement of dials or indicators to point out the exact number of sheets or reams in the roll as well as the weight of a ream and the weight of the roll. In illustrating my improvement I have thought it unnecessary to show the details of the weighing machine mechanism as such elements may be of any well known construction suitable for rotating a dial in accordance with the weight. The Toledo Scale Company, of Toledo, Ohio, manufactures weighing scales to which the present invention may be applied with the necessary additions and modifications which will be hereinafter disclosed.

Referring to the drawings which show the preferred embodiment of my invention,—

Fig. 1 is an elevation of the machine;

Fig. 2 is an enlarged detail of adjacent portions of the rotating dials;

Fig. 3 is a detailed section of said dials along line 3—3 of Fig. 1;

Fig. 4 is a detail view of the marker supporting arm;

Fig. 5 is a detail of the cable connection to an operating element for one dial;

Figures 6, 7:
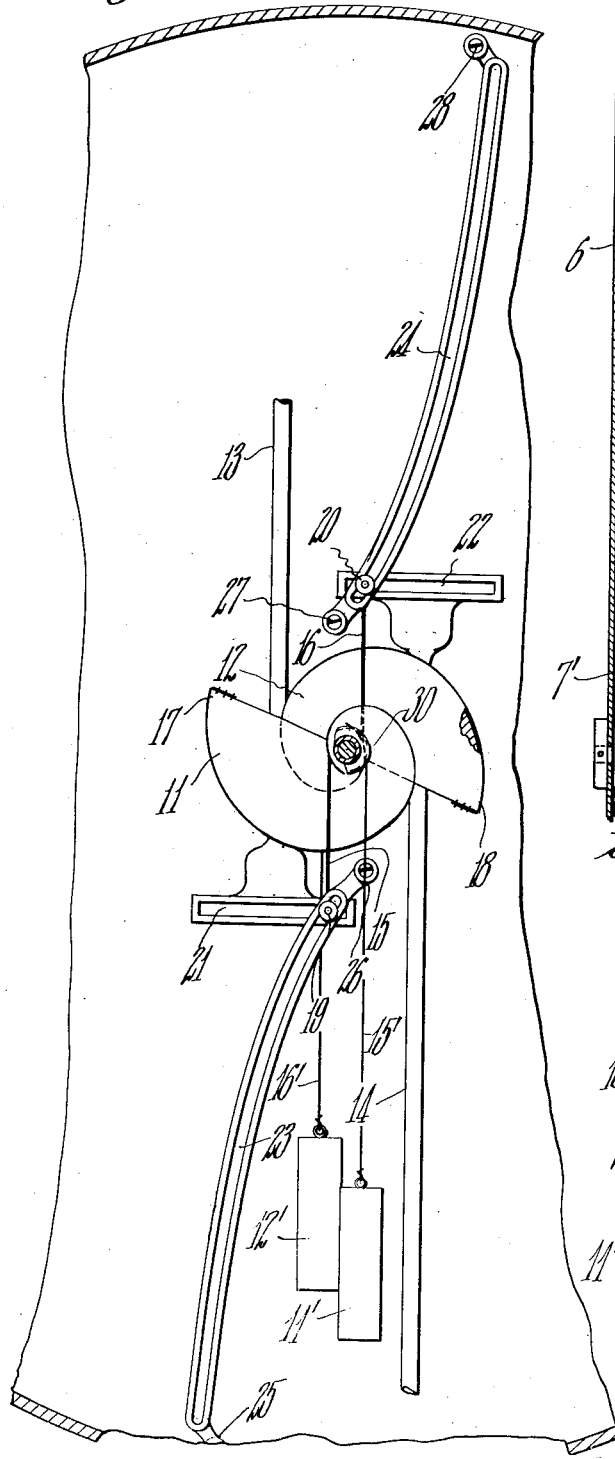
Fig. 6 is a view in elevation of the dial operating elements looking in direction of the arrow *a* of Fig. 7 showing connections therefrom for operating the dials in accordance with the present invention.
Fig. 7 is a side elevation partly in section of the parts shown in Fig. 6.

Referring more particularly to the drawings, 1 indicates the casing of the weighing machine, 2 indicates the platform for receiving the heavier weight such as a roll of paper whose weight is to be determined and 3 indicates a scale pan for receiving the lighter weight such as a few sheets of paper for determining the weight thereof. 4 indicates a suitable tare beam device of any suitable construction such as is usual in all scales. 5 and 6 indicate respectively, separate rotatable dials or indicators of weight values concentrically mounted as shown so that the graduations thereon may be read in juxtaposition for the ratio determination hereinafter mentioned. 7 indicates a marker carried on the dial 5 and adjustable thereon by hand to different fixed positions. The weight of this marker 7 upon the dial 5 is counter-balanced by its supporting arm 7' as shown in Fig. 4 and said marker 7 is also yieldingly held in its adjusted position upon the dial 5 by a suitable spring 7", (see Fig. 3). Z indicates a zero point marked on the fixed portion of the casing 1 surrounding the dials.

It will be understood that the dials 5 and 6 are operated independently from one another; dial 5 for instance, is operated by connections to scale pan 3 and dial 6 by connections to the weighing platform 2. Preferably, each of the dials 5 and 6 have marked thereon a scale 9 and 10 respectively, in juxtaposition for registering with one another and it will be observed that the graduations on each of these scales are marked off to represent graphically a measure of the logarithms of the weights to be indicated but are denoted by a real representation of the weights. In other words, each dial is marked with the well known logarithmic scale of a circular "slide-rule" while the numbers thereon indicate the actual weight values to be measured. For example, if seven pounds were placed on the scale pan 3 the dial 5 will be rotated counter-clockwise to bring the numeral seven of the logarithmic scale opposite zero point Z and the same is true of the dial 6 when a weight is placed on the platform 2.

The dial or pointer of an ordinary weighing scale of course rotates through equal angles for equal increments of weight measured and the present improvement provides means for translating this uniform travel of the dial operating member of the usual weighing scale into the variable travel necessary to correspond with the logarithmic scale on the present dial.

Referring more particularly to Figs. 6 and 7, there is shown fixed to the shaft of each dial 5 and 6 a logarithmic scroll or reel 11 and 12 respectively. Grooved drums 30 are integral with each of the scrolls 11 and 12. 13 and 14 indicate vertically moving operating elements or rods of the usual weighing machine mechanism of the dial type, and it is understood that such elements are moved with a uniform travel in accordance with the weight operating the same, and are returned to a normal position in the usual well-known manner. The rod 13 is guided for vertical movement and is connected to the scale pan 3 by any usual weighing machine mechanism not shown, and rod 14 is similarly guided and is likewise connected to the platform 2. Cables 15 and 16 are wound around grooved peripheries of the scrolls 11 and 12 respectively and are anchored at the outermost or enlarged ends 17 and 18 of their respective scrolls. Each cable is separately connected to an operating element 13 and 14, for instance, cable 15 is connected to a roll 19 rotatably mounted in a slotted portion 21 of the rod 13 and cable 16 is connected to a roll 20 rotatably mounted in a slotted portion 22 of the rod 14, see Fig. 5. The rolls 19 and 20 in addition to being carried in their respective slots 21 and 22 are also caused to travel in fixed guiding slots 23 and 24 respectively for the purpose to be described. The guiding slots 23 and 24 are fixed in any suitable manner to the casing of the machine as by screws 25, 26, 27 and 28.

A cable 15' is wound upon the drum 30 of the scroll 11 and a cable 16' is wound upon the drum 30 of the scroll 12. Each of the cables 15' and 16' are attached to the periphery of their respective drums and have connected to their lower ends the weights 11' and 12'.

It will be understood that when the vertical rod 13, for instance, is caused to move downwardly with uniform travel due to a weight placed upon the scale pan 3, it will cause cable 15 to unwind from and rotate scroll 11, and that the periphery of said scroll 11 is plotted to the necessary contour for giving the dial 5, to which it is fixed, a rotation in accordance with the logarithms of the weights placed upon the scale pan 3. In translating the uniform movement of the rod 13 into what I may call for convenience the logarithmic movement of the dial 5 it is desirable that cable 15 continue in a vertical path as it is unwound from the scroll 11 and for this purpose it is connected to the roll 19 which moves laterally in the slot 21 at the same time that it moves vertically downwardly. The slot 23 is plotted to give the proper lateral guiding movement to said roll 19 to maintain the cable 16 in its vertical position during its unwinding movement. What has been said with regard to the connections from the rod 13 to dial 5 applies also to rod 14 and its connection to dial 6 as these parts are operated similarly but independently.

During the movement of the rods 13 and 14 which causes the unwinding of the cables from their respective scrolls, the cables 15' and 16' and carrying the weights 11' and 12' are wound upon the grooved drums 30 and return the scrolls 11 and 12 to their normal or zero position when the weights are removed from the platforms 2 and 3 of the weighing machine.

An example of the use of the machine in solving a simple problem will now be given.—Assume that it is desired to ascertain the number of reams in a roll of paper placed on the platform 2. A ream of paper is placed upon the scale pan 3. The indicator 7 is first adjusted by hand to coincide with the numeral one on scale 9 of the dial 5. We will assume that the roll upon the platform 2 weighs eight pounds. Dial 6 will then be moved counterclockwise until the numeral eight of the scale 10 comes opposite the zero marker Z. Assume that the ream of paper weighs 2 pounds, then the dial 5 will also move counterclockwise to bring numeral two of its scale 9 opposite the fixed zero marker Z. The answer is, of course, read under "the one" of the dial 5 which in this instance is coincident with the marker 7 and it will be found that this marker will be pointing to the numeral four of dial 6 thereby indicating that the roll of paper weighs four times as much as the ream and consequently contains four reams. In actual practice an entire ream of paper would not be placed upon the scale pan 3, but only a few sheets i. e. a known part of a ream, and the dial of the scale pan would be graduated so as to read in pounds for the ream of which the number of sheets was a known part.

In the foregoing illustration due to the simplicity of the problem assumed, the marker 7 was made to coincide with the numeral one of the scale 9 but there may be occasions for shifting the position of the marker 7 to other figures on the scale 9 for solving problems of a different nature. For instance in the hardware business, it may be desired to count the number of bolts in a box. In this case the box of bolts would be placed upon the platform 2. A few bolts, four for instance, would be placed in the scale pan 3. The marker 7 would then be adjusted on the scale 9 to coincide with the numeral four (the number of bolts in the scale pan) and this marker 7 would then read directly on the scale 10 of the dial 6 the number of bolts in the box on the platform 2 according to the logarithmic principles of slide rule computation.

Many further illustrations of the utility of my present invention might be instanced, and it is to be understood that the specific mechanism herein described and shown might be modified in many ways without departing from the scope of the invention as hereinafter claimed.

I claim—

1. In a ratio computing machine, a pair of relatively movable and adjacent dials for indicating weight values, and a separate gravity actuated measuring device controlling each dial arranged to move the same graphically in accordance with the logarithms of weight values measured whereby a ratio of measured values of the same kind may be determined by said dials.

2. In a ratio computing machine, a pair of relatively movable and adjacent indicators of weight values, and a separate weight controlled mechanism for each indicator arranged to move the same graphically in accordance with the logarithms of the weight values measured.

3. In a ratio computing machine, a pair of relatively movable and adjacent dials for indicating weight values, a separate weight controlled mechanism for each indicator dial arranged to move the same graphically in accordance with the logarithms of the weight values measured, a marker mounted for frictional sliding adjustment on one of said indicator dials, and means movable in unison with the marker for counterbalancing the indicator to compensate for the weight of the marker in whatever position of adjustment the marker may be located.

4. In a ratio computing machine, a pair of relatively movable and adjacent indicators of weight values, one of said indicators having thereon a logarithmic scale and the other a marker for registering on said scale, and a separate weight controlled mechanism for each indicator arranged to move the same graphically in accordance with the logarithms of the weight values measured whereby the ratio of weights measured may be read off by the position of said marker on said logarithmic scale.

5. In a ratio computing machine, a pair of relatively movable and adjacent indicators of weight values, each of said indicators having thereon a logarithmic scale for registering with one another for ratio reading, and a separate weight controlled mechanism for each indicator arranged to move the same graphically in accordance with the logarithms of the weight values measured.

6. In a ratio computing machine, a pair of relatively movable and adjacent indicators of weight values, each of said indicators having thereon a logarithmic scale for registering with one another for ratio reading, a separate weight controlled mechanism for each indicator arranged to move the same graphically in accordance with the logarithms of the weight values measured, and a marker adjustably carried on one of said scales, and means for counterbalancing the weight of the marker.

7. In a ratio-computing machine, a disk dial having its margin graduated to provide a logarithmic scale for indicating weight values, an annular dial encircling the disk dial and having its inner margin graduated to provide a logarithmic scale for indicating weight values, said dials being relatively rotatable to enable the graduations of said scales to cooperate for ratio reading, and a separate mechanism for each dial arranged to move the same in accordance with the logarithms of the weight values measured.

8. In a ratio computing machine, a pair of relatively rotatable and adjacent dials for indicating weight values, each of said dials having thereon a logarithmic scale for registering with a logarithmic scale on the other dial for ratio reading, a separate weight controlled mechanism for each dial arranged to rotate the same in accordance with the logarithms of the weight values measured, a marker mounted for frictional sliding adjustment on one of said dials, and a weight connected with said marker and arranged relatively to said dial to counterbalance the weight of said dial and marker.

9. In a computing device, a dial, having thereon a logarithmic scale, indicating means for cooperating with said scale, a weight-controlled member movable in a rectilinear path, a rotatable logarithmic scroll upon which said dial is carried, a cable connecting said member and said scroll in a line parallel to the direction of movement of said member and adapted to wind up on the periphery of the scroll, the point of connection between said cable and said member being movable at right angles to the direction of movement of said member, and means for guiding said point of connection as said cable winds up on said scroll to maintain the cable in parallelism to the direction of movement of said member.

KARL R. HAMMOND.